US012339612B2

(12) United States Patent
Kikuchi

(10) Patent No.: US 12,339,612 B2
(45) Date of Patent: Jun. 24, 2025

(54) IMAGE FORMING APPARATUS WITH CONTROLLER FOR ADJUSTING POWER SUPPLIED TO HEATING ELEMENT OF FIXING DEVICE BASED ON CUMULATIVE PRIOR USE METRIC

(71) Applicant: TOSHIBA TEC KABUSHIKI KAISHA, Tokyo (JP)

(72) Inventor: Kazuhiko Kikuchi, Yokohama Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/079,491

(22) Filed: Dec. 12, 2022

(65) Prior Publication Data

US 2023/0104948 A1 Apr. 6, 2023

Related U.S. Application Data

(63) Continuation of application No. 17/339,410, filed on Jun. 4, 2021, now Pat. No. 11,531,297.

(30) Foreign Application Priority Data

Aug. 3, 2020 (JP) ................................ 2020-131494

(51) Int. Cl.
*G03G 15/20* (2006.01)
*G03G 15/00* (2006.01)

(52) U.S. Cl.
CPC .................................... *G03G 15/80* (2013.01)

(58) Field of Classification Search
USPC ........................................................... 399/90
See application file for complete search history.

(56) References Cited

U.S. PATENT DOCUMENTS 5,656,187 A 8/1997 Miyamoto
2007/0212092 A1 9/2007 Tsujimura
2010/0239301 A1* 9/2010 Nemoto ............ G03G 15/2039 399/69
2011/0242602 A1* 10/2011 Ikeda .................... G03G 15/55 358/1.15

(Continued)

FOREIGN PATENT DOCUMENTS

CN 1652043 A * 8/2005 ........... G03G 15/205
JP H0511653 1/1993

(Continued)

OTHER PUBLICATIONS

Computer translation of CN 1652043A to Koyama (Year: 2005); merged.*

(Continued)

*Primary Examiner* — Quana Grainger
(74) *Attorney, Agent, or Firm* — Kim & Stewart LLP

(57) ABSTRACT

In one embodiment, an image forming apparatus includes a fixing device with a heating element to heat a sheet. A controller is configured to control electric power supplied to the heating element based on a prior use metric. The controller reduces the electric power supplied to the heating element during a startup period if an electric power level supplied from a power supply is equal to or greater than a threshold value and the prior use metric is equal to or greater than a reference value.

20 Claims, 8 Drawing Sheets

(56) References Cited

U.S. PATENT DOCUMENTS

| | | | | |
|---|---|---|---|---|
| 2013/0243464 | A1* | 9/2013 | Odaka | G03G 15/5004 399/67 |
| 2014/0185096 | A1 | 7/2014 | Tokunaga | |
| 2014/0205306 | A1 | 7/2014 | Miyamae | |
| 2014/0321873 | A1* | 10/2014 | Kadowaki | G03G 15/2042 399/92 |
| 2016/0234882 | A1* | 8/2016 | Takagi | H05B 3/22 |
| 2018/0335821 | A1* | 11/2018 | Kamiya | G03G 15/55 |
| 2019/0025738 | A1* | 1/2019 | Hasegawa | G03G 15/2039 |
| 2019/0286029 | A1 | 9/2019 | Adachi et al. | |

FOREIGN PATENT DOCUMENTS

| | | | |
|---|---|---|---|
| JP | H0830125 | A | 2/1996 |
| JP | 2002189363 | A | 7/2002 |
| JP | 2006072027 | A | 3/2006 |
| JP | 2006119194 | A | 5/2006 |
| JP | 2017090644 | A | 5/2017 |
| JP | 2018189792 | A | 11/2018 |
| JP | 2019028188 | A | 2/2019 |
| KR | 20080037881 | A | 5/2008 |

OTHER PUBLICATIONS

Japanese Office Action dated Feb. 13, 2024, mailed in counterpart Japanese Application No. 2020-131494, 8 pages (with translation).

Japanese Office Action dated Jun. 25, 2024, mailed in counterpart Japanese Application No. 2020-131494, 8 pages (with translation).

* cited by examiner

IMAGE FORMING APPARATUS WITH CONTROLLER FOR ADJUSTING POWER SUPPLIED TO HEATING ELEMENT OF FIXING DEVICE BASED ON CUMULATIVE PRIOR USE METRIC

CROSS-REFERENCE TO RELATED APPLICATION

This application is a continuation of U.S. patent application Ser. No. 17/339,410, filed on Jun. 4, 2021, which is based upon and claims the benefit of priority from Japanese Patent Application No. 2020-131494, filed Aug. 3, 2020, the entire contents of each of which are incorporated herein by reference.

FIELD

Embodiments described herein relate generally to an image forming apparatus.

BACKGROUND

An image forming apparatus includes a fixing device for fixing toner to a sheet of paper or the like. The fixing device includes a heating element. A resistor is sometimes used as the heating element. In such a case, the resistor sometimes breaks if a voltage larger than its rated voltage is applied to the resistor. After such breakage, heating cannot be performed and device downtime or failure occurs.

DETAILED DESCRIPTION

In and embodiment, an image forming apparatus includes a controller and a fixing device with a heating element to heat a sheet. The controller is configured to control electric power supplied to the heating element based on a prior use metric. The controller reduces the electric power supplied to the heating element during a startup period if an electric power level supplied from a power supply is equal to or greater than a threshold value and the prior use metric is equal to or greater than a reference value.

With an image forming apparatus according to an embodiment, it is possible to reduce the occurrences of a deficiency in an image forming apparatus due to a failure of a heating element or the like.

Figure 1:
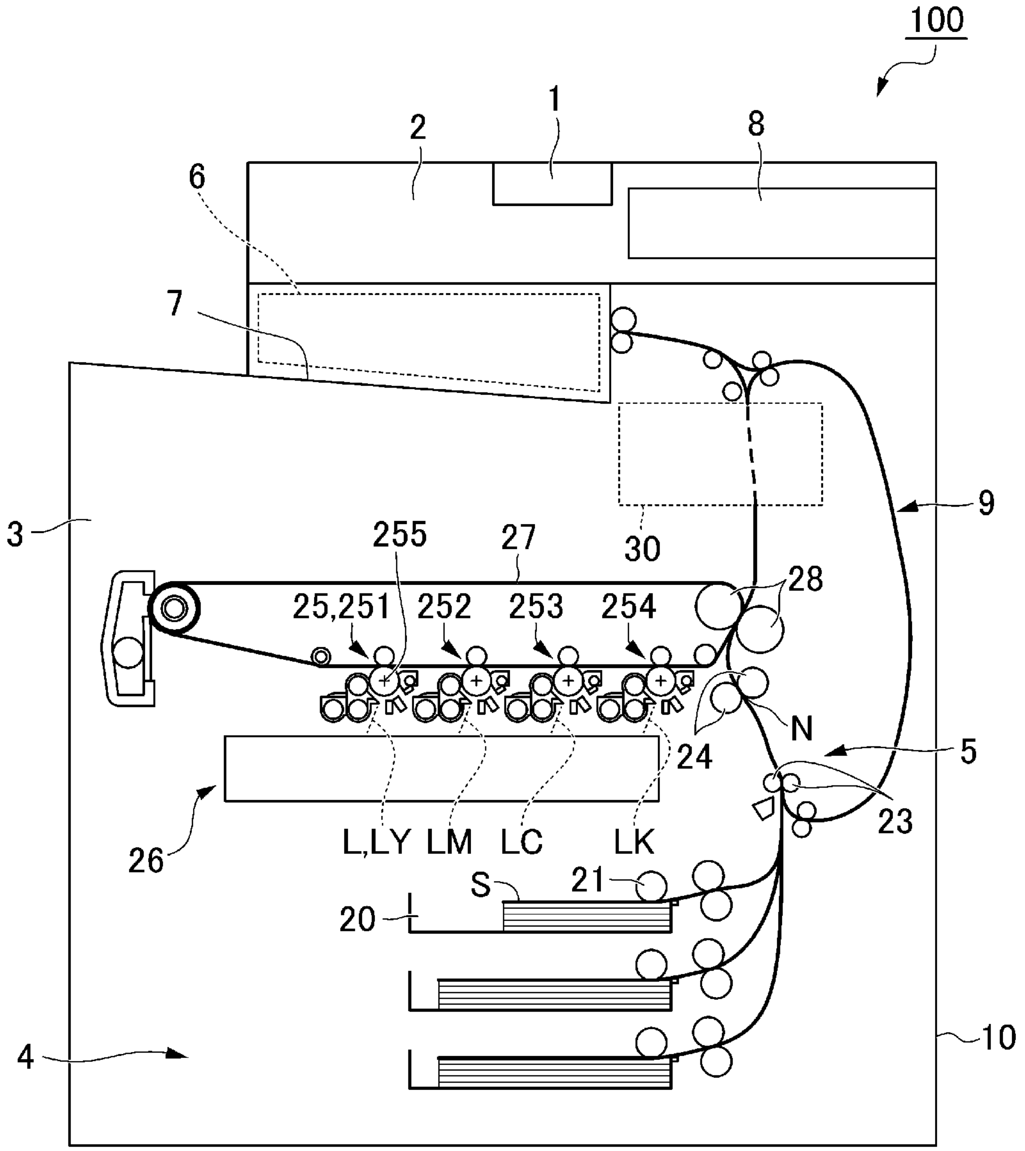
FIG. 1 depicts an image forming apparatus.

FIG. 1 is a diagram illustrating an overview of the configuration of the image forming apparatus 100 of an embodiment. The image forming apparatus 100 in the present embodiment is, for example, a multifunction peripheral (MFP). The image forming apparatus 100 includes a housing 10, a display 1, a scanner section 2, an image forming unit 3, a sheet supplying section 4, a conveying section 5, a paper discharge tray 7, a reversing unit 9, a control panel 8, and a control section (controller) 6.

The image forming apparatus 100 forms an image on a sheet S using a developer such as toner. In general, the sheet S may be any sheet type or size so long the image forming apparatus 100 can form an image on a surface of the sheet.

The housing 10 forms the exterior of the image forming apparatus 100. The display 1 is an image display device such as a liquid crystal display or an organic EL (Electro Luminescence) display. The display 1 can be used to display various kinds of information concerning the image forming apparatus 100.

The scanner section 2 reads reading target image information based on brightness and darkness of light. The scanner section 2 records the read image information. The scanner section 2 can output the recorded image information to the image forming unit 3. The recorded image information may be instead or additionally transmitted to another information processing apparatus via a network or the like.

The image forming unit 3 forms a toner image based on the image information received from the scanner section 2 or otherwise image information received from the outside. The toner may be referred to as a recording agent in some instances. The image forming unit 3 transfers the toner image onto the front surface of the sheet S. The image forming unit 3 heats and presses the toner image on the surface of the sheet S and thus fixes the toner image to the sheet S. The sheet S may be a sheet supplied by the sheet supplying section 4 or may be a manually fed sheet.

The sheet supplying section 4 supplies sheets S to the conveying section 5 one by one to match the timing at which the image forming unit 3 forms the toner image. The sheet supplying section 4 includes a sheet storing section 20 and a pickup roller 21.

The sheet storing section 20 stores the sheets S of a predetermined size and a predetermined type. The pickup roller 21 picks up the sheets S from the sheet storing section 20 one by one. The pickup roller 21 supplies the picked-up sheet S to the conveying section 5.

The conveying section 5 conveys the sheet S to the image forming unit 3. The conveying section 5 includes conveying rollers 23 and registration rollers 24. The conveying rollers 23 convey the sheet S to the registration rollers 24. The conveying rollers 23 abut the leading end of the sheet S against a nip N formed by the registration rollers 24.

The registration rollers 24 hold the sheet S at the nip N to thereby align the position of the leading end of the sheet S in the conveying direction. The registration rollers 24 convey the sheet S according to timing at which the image forming unit 3 can appropriately transfer the toner image to the sheet S.

The image forming unit 3 includes a plurality of image forming sections 25, a laser scanning unit 26, an intermediate transfer belt 27, a transfer section 28, and a fixing device 30. The image forming sections 25 each include a photoconductive drum 255. The image forming sections 25 form, on the photoconductive drums 255, toner images corresponding to image information received from the scanner section 2 or the outside. A plurality of image forming sections 251, 252, 253, and 254 respectively form toner images with yellow toner, magenta toner, cyan toner, and black toner.

An electrostatic charging device, a developing device, and the like are disposed around each of photoconductive drums 255. The electrostatic charging devices charge the surface of the photoconductive drums 255. The developing devices store developers respectively including the yellow, magenta, cyan, and black toners. The developing devices develop the electrostatic latent image that has been formed on a photoconductive drum 255. As a result, different color toner images are formed on the respective photoconductive drums 255.

The laser scanning unit 26 deflects a laser beam L for scanning the electrostatically charged photoconductive drums 255 to selectively expose the photoconductive drums 255 to light according to the image data. The laser scanning unit 26 exposes the respective photoconductive drums 255 of the image forming sections 251, 252, 253, and 254 to separate laser beams LY, LM, LC, and LK. Consequently, the laser scanning unit 26 forms an electrostatic latent image on the photoconductive drums 255 corresponding to each color of toner.

The toner images on the surfaces of the photoconductive drums 255 are transferred (referred to as a primary transfer) to the intermediate transfer belt 27. The transfer section 28 then transfers these toner images from the intermediate transfer belt 27 onto the surface of a sheet S at a secondary transfer position. The fixing device 30 heats and presses the toner images on the sheet S and thus fixes the toner images to the sheet S.

The reversing unit 9 reverses the sheet S in order to form an image on the back side of the sheet S. The reversing unit 9 reverses, with a switchback, the front and the back sides of the sheet S after the sheet S has been discharged from the fixing device 30. The reversing unit 9 conveys the reversed sheet S back toward the registration rollers 24 for another printing operation on the back side of the sheet S.

The discharged sheet S, on which the images have been formed, is placed on paper discharge tray 7. The control panel 8 includes a plurality of buttons. The control panel 8 receives input operation from a user. The control panel 8 outputs a signal corresponding to the input operation performed by the user to the control section 6 of the image forming apparatus 100. The display 1 and the control panel 8 may be configured as an integrated touch panel. The control section 6 performs control of the various sections of the image forming apparatus 100.

Figure 2:
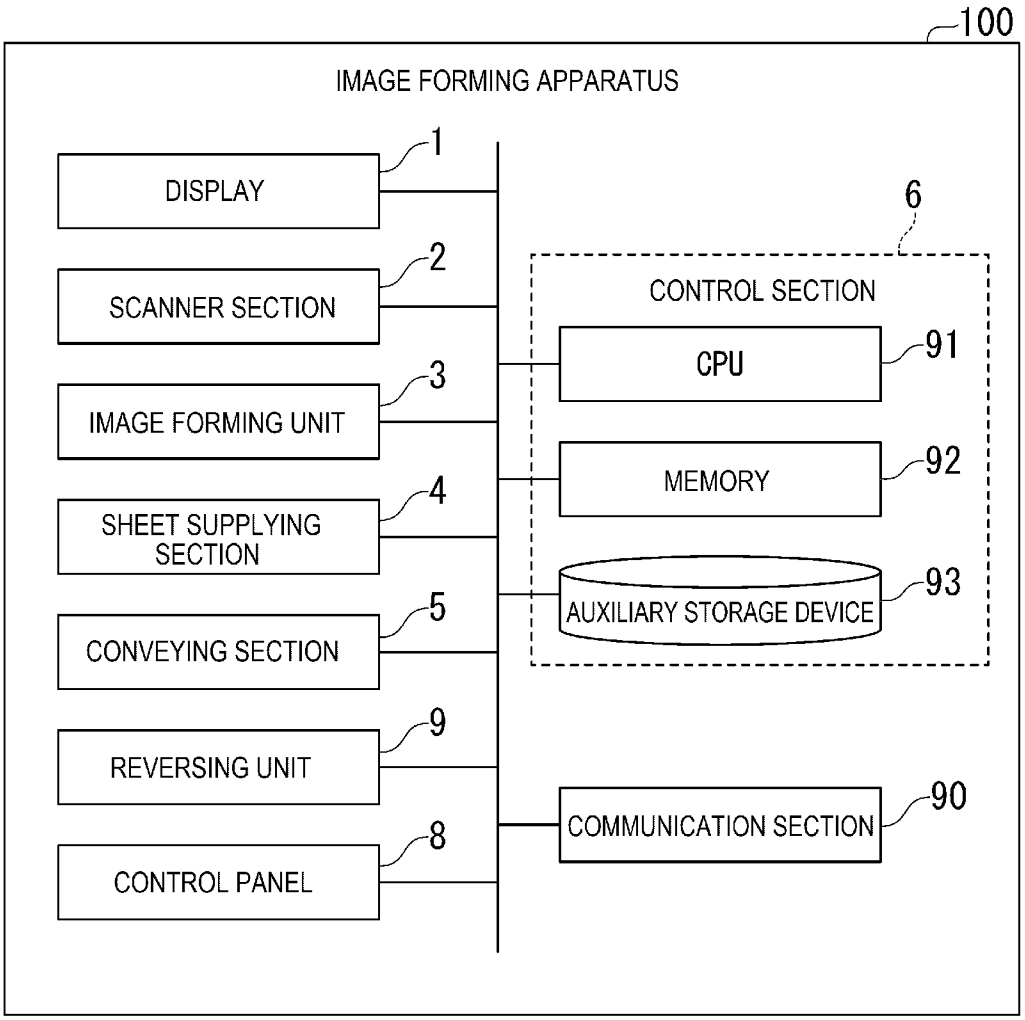
FIG. 2 depicts aspects of a hardware configuration of an image forming apparatus.

FIG. 2 is a diagram illustrating a specific example of a hardware configuration of an image forming apparatus 100 in the present embodiment. The image forming apparatus 100 includes a CPU (Central Processing Unit) 91, a memory 92, and an auxiliary storage device 93 connected by a bus. The CPU 91 executes a software program or the like. By executing the program, the image forming apparatus 100 provides the described function of the scanner section 2, the image forming unit 3, the sheet supplying section 4, the conveying section 5, the reversing unit 9, the control panel 8, and a communication section 90. In some examples, some or all of the functions of the image forming apparatus 100 may be realized using hardware, such as an ASIC (Application Specific Integrated Circuit), a PLD (Programmable Logic Device), or an FPGA (Field Programmable Gate Array), instead of software. The program may be recorded in a non-transitory computer-readable recording medium. The computer-readable recording medium is, for example, a portable medium such as a flexible disk, a magneto-optical disk, a ROM, or a CD-ROM or a storage device such as a hard disk incorporated in a computer system. The program may be transmitted, downloaded, or accessed via a communication line, network, or the like.

The CPU 91 executes the program stored in the memory 92 and the auxiliary storage device 93 to thereby provide various functions of control section 6. The control section 6 controls the overall functions of the components and/or sub-units of the image forming apparatus 100.

The auxiliary storage device 93 comprises a magnetic hard disk device (HDD) or a semiconductor storage device (SSD). The auxiliary storage device 93 stores various kinds of information concerning the image forming apparatus 100.

The communication interface 90 can be used for connecting the image forming apparatus 100 to an external apparatus.

Figure 3:
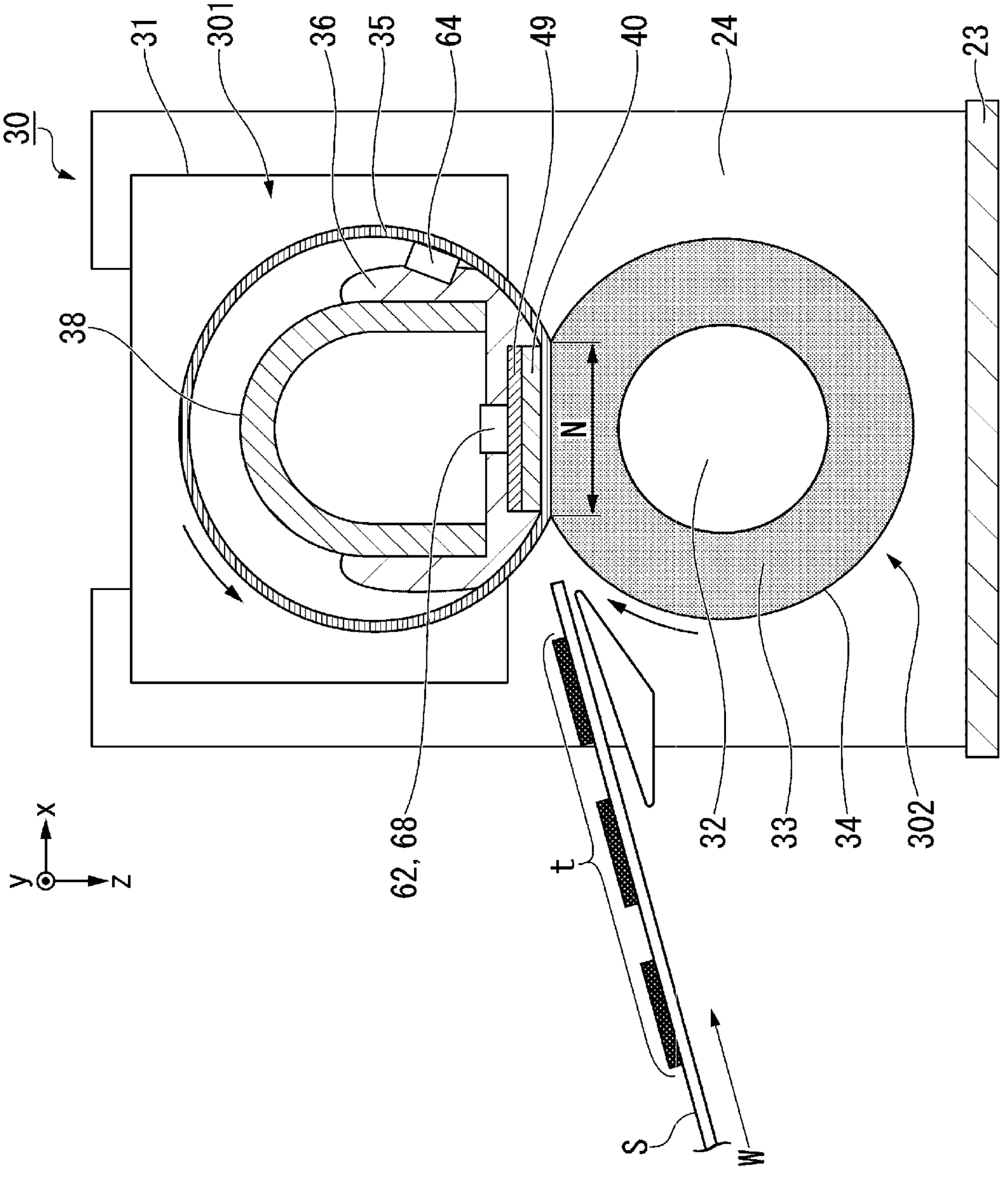
FIG. 3 is a cross-sectional view of a heating device.

FIG. 3 is a diagram illustrating the fixing device 30. The fixing device 30 includes a press roller 302 and a fixing unit 301 (also referred to as a fixing drum or the like).

A nip N is formed between the press roller 302 and the fixing unit 301. The press roller 302 press a toner image t on a sheet S that enters the nip N. The press roller 302 rotates and conveys the sheet S through the nip N. The press roller 302 includes a core bar 32, an elastic layer 33, and a release layer 34. The press roller 302 is capable of pressing against a fixing film 35 of the fixing unit 301 while being driven to rotate.

The core bar 32 is formed of a metal material such as stainless steel. Both the end portions in the axial direction of the core bar 32 are rotatably supported. The core bar 32 can be driven to rotate by a motor. The core bar 32 can be in contact with a cam member. When such a cam member rotates it can cause the core bar 32 to approach or separate from the fixing unit 301.

The elastic layer 33 is formed of an elastic material such as silicone rubber. The elastic layer 33 is formed on the outer circumferential surface of the core bar 32 with fixed thickness. The release layer 34 is formed of a resin material such as PFA (tetrafluoroethylene-perfluoroalkylvinylether copolymer). The release layer 34 is formed on the outer circumferential surface of the elastic layer 33. The hardness of the outer circumferential surface of the press roller 302 is desirably 40° to 70° with an ASKER-C hardness meter at a load of 9.8 N. Consequently, the area of the nip N and durability of the press roller 302 are secured. In this embodiment, the hardness is set to 60°.

The press roller 302 is capable of approaching and separating from the fixing unit 301 according to the rotation of the cam member. If the press roller 302 is caused to approach the fixing unit 301 and is pressed by a pressurizing spring, the nip N is formed. On the other hand, if a jam of the sheet S occurs in the fixing device 30, the sheet S can be removed by causing the press roller 302 to separate from the fixing unit 301. Ina state in which the rotation of the fixing film 35 is expected to be stopped for a significant time, such as in a device sleep state, device idle state or the like, the press roller 302 can be caused to separate from the fixing unit 301, whereby plastic deformation of the fixing film 35 can be prevented.

The press roller 302 is driven to rotate by a motor. If the press roller 302 rotates while the nip N is formed (e.g., the press roller 302 is being pressed against the fixing film 35), the fixing film 35 of the fixing unit 301 rotates due to the rotation of the press roller 302. The press roller 302 thus conveys the sheet S in a conveying direction W by rotating while the sheet S is in the nip N.

The fixing unit 301 heats the toner image t on the sheet S entering the nip N. The fixing unit 301 includes the fixing film 35, a heater unit 40, a heat conduction member 49, a supporting member 36, a stay 38, a heater thermometer 62, a thermostat 68, and a film thermometer 64.

The fixing film 35 is formed in a generally cylindrical tube shape. The fixing film 35 includes, in order from the inner circumference side, a base layer, an elastic layer, and a release layer. The elastic layer is stacked and disposed on the outer circumferential surface of the base layer. The elastic layer is formed of an elastic material such as silicone rubber. The release layer is stacked and disposed on the outer circumferential surface of the elastic layer. The release layer is formed of a material such as PFA resin.

Figure 4:
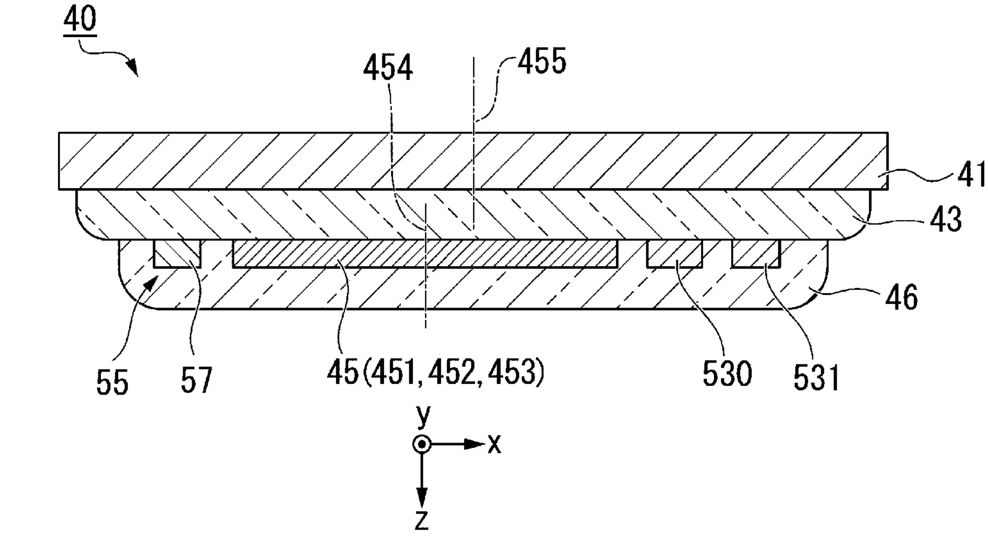
FIG. 4 is a cross-sectional view of a heater unit.
Figure 5:
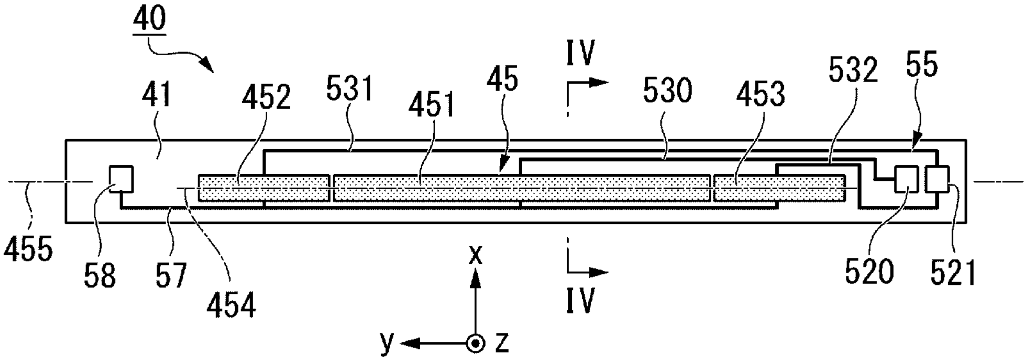
FIG. 5 is a bottom view of a heater unit.

FIG. 4 is a cross-sectional view of a heater unit 40 taken along a IV-IV line in FIG. 5. FIG. 5 is a bottom view (a view from a +z direction) of a heater unit 40. The heater unit 40 includes a heat generator substrate 41 ("substrate 41" for simplicity), a heat generator group 45, and a wire group 55.

The substrate 41 is formed of a metal material such as stainless steel, a ceramic material such as aluminum nitride, or the like. The substrate 41 is formed in an elongated rectangular plate shape. The substrate 41 is disposed on the inner side in the radial direction of the fixing film 35. The substrate 41 has the axial direction of the fixing film 35 as a longitudinal direction.

In the present example, an x direction, a y direction, and a z direction are defined as described below. The y direction is the longitudinal direction of the substrate 41. The y direction is also parallel to the width direction of the fixing film 35. For purposes of description, the +y direction is a direction from the center portion heat generator 451 toward the first end portion heat generator 452. The x direction is the latitudinal (width) direction of the substrate 41. The +x direction is the conveying direction of the sheet S (that is, the downstream direction). The z direction is a direction normal to the substrate 41, and the +z direction is the direction in which the heat generator group 45 is disposed with respect to the substrate 41. An insulating layer 43 is formed on a glass material or the like on the +z direction surface side of the substrate 41.

The heat generator group 45 is disposed on the substrate 41. As illustrated in FIG. 4, the heat generator group 45 is formed on the +z direction surface side of the insulating layer 43. The heat generator group 45 is formed of a temperature coefficient of resistance ("TCR") material. For example, the heat generator group 45 is formed of a silver-palladium alloy or the like. The exterior of the heat generator group 45 is formed in a rectangular shape having the y direction as a longitudinal direction and having the x direction as a latitudinal (width) direction.

As illustrated in FIG. 5, the heat generator group 45 includes a first end portion heat generator 452, a center portion heat generator 451, and a second end portion heat generator 453.

The center portion heat generator 451 is disposed in the center of the heat generator group 45 along the y direction. In some examples, the center portion heat generator 451 may be a plurality of smaller, individual heat generators disposed side by side along the y direction.

The first end portion heat generator 452 is disposed beyond the center portion heat generator 451 in the +y direction and is at the +y direction end portion of the heat generator group 45.

The second end portion heat generator 453 is disposed beyond the center portion heat generator 451 in the −y direction and is at the −y direction end of the heat generator group 45.

The boundary between the center portion heat generator 451 and the first end portion heat generator 452 may be parallel to the x direction or may be at angle crossing the x direction. The same applies to a boundary between the center portion heat generator 451 and the second end portion heat generator 453.

The heat generator group 45 generates heat when supplied with electric power, which can be referred to as being energized. The electric resistance value of the center portion heat generator 451 is less than electric resistance values of the first end portion heat generator 452 and the second end portion heat generator 453. A resistance value ratio for the center portion heat generator 451 and the first end portion heat generator 452 is preferably in a range of 1:3 to 1:7 and is more preferably in a range of 1:4 to 1:6. A resistance value ratio of the center portion heat generator 451 and the second end portion heat generator 453 is preferably in a range of 1:3 to 1:7 and is more preferably in a range of 1:4 to 1:6.

A sheet S having a relatively small width in the y direction can passes through just the center portion of the fixing device 30. In this case, the control section 6 can cause just the center portion heat generator 451 to generate heat. On the other hand, in the case of the sheet S having a relatively large width in the y direction, the control section 6 causes the entire heat generator group 45 to generate heat. The center portion heat generator 451 can be controlled independently of the first portion heat generator 452 and the second end portion heat generator 453. In this example, the first end portion heat generator 452 and the second end portion heat generator 453 are controlled to generate heat in the same manner.

The wire group 55 is formed of a metal material such as silver. The wire group 55 includes a center contact 520, a center wire 530, an end contact 521, a first end wire 531, a second end wire 532, a common contact 58, and a common wire 57.

The center contact 520 is disposed in the −y direction from of the heat generator group 45. The center wire 530 is disposed in the +x direction from the heat generator group 45. The center wire 530 connects the +x direction end of the center portion heat generator 451 to the center contact 520.

The end contact 521 is disposed in the −y direction from the center portion contact 520. The first end wire 531 is disposed in the +x direction from the heat generator group 45 and the +x direction from the center wire 530. The first end wire 531 connects the +x direction end of the first end portion heat generator 452 and the +x direction end of the end contact 521. The second end wire 532 is disposed in the +x direction from the heat generator group 45 and the −x direction from the center wire 530. The second end wire 532 connects the +x direction end of the second end portion heat generator 453 and the −x direction end of the end contact 521.

The common contact 58 is disposed in the +y direction from the heat generator group 45. The common wire 57 is disposed on the −x direction side of the heat generator group 45. The common wire 57 connects the center portion heat generator 451, the first end portion heat generator 452, and the second end portion heat generator 453 and the common contact 58.

The second end wire 532, the center wire 530, and the first end wire 531 are disposed on the +x direction side of the heat generator group 45. In contrast, only the common wire 57 is disposed in the −x direction of the heat generator group 45. Accordingly, a center 454 in the x direction of the heat generator group 45 is disposed further in the −x direction than a center 455 in the x direction of the substrate 41.

The centerline 454 (see FIG. 4) of the heat generator group 45 is positioned to be on the straight line that would connect the center of the press roller 302 and the center of the fixing unit 301 (more particularly the center axis of the cylinder formed by fixing film 35). However, as depicting in FIG. 4, the centerline 455 of the substrate 41 is offset in the +x direction from the centerline 454. Consequently, since the substrate 41 extends in the +x direction width of the nip N, a sheet S passed through the nip N is more easily released from the fixing unit 301 than would otherwise be the case.

The entire heat generator group 45 is positioned to be within the region of the nip N. The heat generator group 45 is positioned to be in the center of the nip N. Consequently, a heat distribution within the nip N becomes more uniform and a sheet S passing through the nip N will be more uniformly heated.

As illustrated in FIG. 4, the heat generator group 45 and the wire group 55 are formed on the surface on the +z direction side of the insulating layer 43. A protective layer 46 is formed of a glass material or the like to cover the heat generator group 45 and the wire group 55. The protective layer 46 improves slidability (reduces friction) between the heater unit 40 and the fixing film 35.

As illustrated in FIG. 3, the heater unit 40 is disposed on the inner side of the fixing film 35. A lubricant is generally applied to the inner circumferential surface of the fixing film 35. The heater unit 40 will be in contact with the inner circumferential surface of the fixing film 35 via the lubricant. However, when the heater unit 40 generates heat, the viscosity of the lubricant decreases with the resulting increase in temperature. Thus, the slidability of the heater unit 40 and the fixing film 35 is improved. The fixing film 35 is a belt-like thin film that slides on the surface of the heater unit 40 while coming into contact with the heater unit 40 on one side.

The heat conduction member 49 is formed of a metal material having high thermal conductivity such as copper. In some examples, the heat conduction member 49 matches the planar shape of the substrate 41. The heat conduction member 49 contacts the −z direction side surface of the heater unit 40. Nickel plating can be applied to the surface of the heat conduction member 49 contacting the heater unit 40.

The supporting member 36 has high structural rigidity, heat tolerance, and thermal insulating properties. The support member 36 can be formed of a resin material such as liquid crystal polymer. The supporting member 36 is disposed to cover, on the −z direction side, and the x direction ends of the heater unit 40 as well as the outer edges of the heater unit 40 on the x-direction ends. The end portions of the supporting member 36 can be rounded to support the inner circumferential surface of the fixing film 35.

When a sheet S passing through the fixing device 30 is heated, the temperature distribution in the heater unit 40 may vary according to a size of the sheet S. When the heater unit 40 temperature increases locally, the temperature may increase to be higher than a heat tolerance temperature of the supporting member 36, which is formed of a resin material. However, the heat conduction member 49 serves to average the temperature distribution across the heater unit 40, thus local temperatures do not easily overcome the heat tolerance of the supporting member 36.

The stay 38 illustrated in FIG. 3 is formed of a steel plate material or the like. The cross-section perpendicular to the y direction of the stay 38 has a U-shape. The stay 38 is attached on the −z direction side of the supporting member 36 and the opening section of the U-shape is therefore closed by the supporting member 36. The stay 38 extends in the y direction. Both the end portions in the y direction of the stay 38 can be fixed to the housing 10 of the image forming apparatus 100. Consequently, the fixing unit 301 is supported by the image forming apparatus 100. The stay 38 improves (increases) rigidity of the fixing unit 301. Flanges 31 that restrict movement of the fixing film 35 in the y direction are attached near both the end portions of the stay 38.

The heater thermometer 62 is disposed on the −z direction side of the heater unit 40 via the heat conduction member 49. For example, the heater thermometer 62 is a thermistor. The heater thermometer 62 can be attached to and supported on the −z direction surface of the supporting member 36. A temperature sensitive element of the heater thermometer 62 can be inserted through a hole in the supporting member 36 to contact the heat conduction member 49. The heater thermometer 62 measures the temperature of the heater unit 40 via the heat conduction member 49. A thermistor element can be disposed on the heater thermometer 62 via a ceramic material or the like for stabilizing the contact to the heater unit 40. The heater thermometer 62 can also be covered with an insulator such as a polyimide tape.

The thermostat 68 is disposed in a similar manner as the heater thermometer 62. The thermostat 68 is incorporated in an electric circuit as explained further below. If the temperature of the heater unit 40 (as detected via the heat conduction member 49) exceeds a predetermined temperature, the thermostat 68 cuts off the power to the heat generator group 45.

Figure 6:
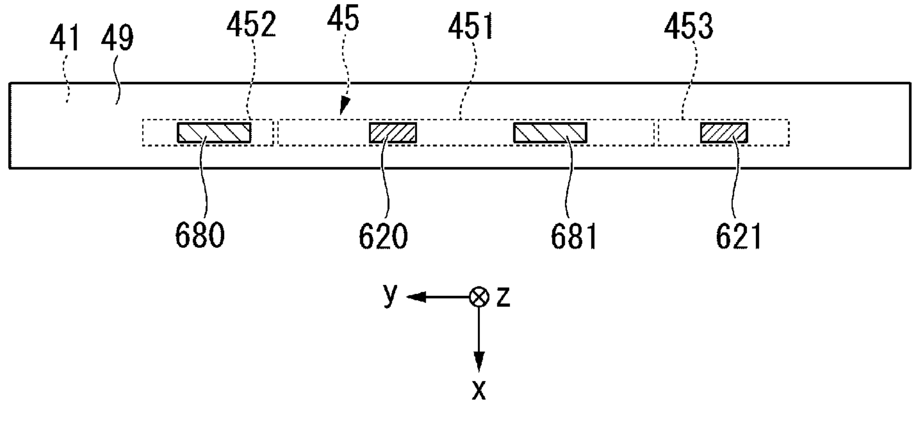
FIG. 6 is a plan view depicting a heater thermometer and a thermostat.

FIG. 6 is a plan view (a view from the −z direction) of the heater thermometer 62 and the thermostat 68. In FIG. 6, the supporting member 36 is omitted from depiction. The following explanation concerning the disposition of the heater thermometer 62, the thermostat 68, and the film thermometer 64 is more particularly an explanation about the disposition of certain temperature sensitive elements of the heater thermometer 62, the thermostat 68, and the film thermometer 64.

A plurality of heater thermometers 62 (more particularly in this example, a center portion heater thermometer 620 and an end portion heater thermometer 621) are spaced from each other along the y direction. The heater thermometers 62 are positioned to be within the y direction range in of the heat generator group 45. In this context, being "within the y direction range" refers to an overlapping of y direction positions in a plan view. The heater thermometers 62 are also positioned to be centered within the x direction width of the heat generator group 45. That is, when viewed from the z direction, the plurality of heater thermometers 62 and the heat generator group 45 overlap at least in a part. A plurality of thermostats 68 (more particularly in this example, a center portion thermostat 681 and an end portion thermostat 680) are similarly disposed as the plurality of heater thermometers 62.

The plurality of heater thermometers 62 includes the center portion heater thermometer 620 and the end portion heater thermometer 621. The center portion heater thermometer 620 measures the temperature of the center portion heat generator 451. The center portion heater thermometer 620 is disposed to overlap with the center portion heat generator 451.

The end portion heater thermometer 621 measures the temperature of the second end portion heat generator 453. As explained above, the heat generation of the first end portion heat generator 452 and the heat generation of the second end portion heat generator 453 can be controlled in the same manner. Accordingly, the temperature of the first end portion heat generator 452 and the temperature of the second end portion heat generator 453 are assumed to be equal to each other in this example. The end portion heater thermometer 621 overlaps the second end portion heat generator 453.

The plurality of thermostats 68 include the center portion thermostat 681 and the end portion thermostat 680. If the temperature of the center portion heat generator 451 exceeds a predetermined temperature, the center portion thermostat 681 cuts off the power to the heat generator group 45. The center portion thermostat 681 is disposed to overlap the center portion heat generator 451.

If the temperature of the first end portion heat generator 452 exceeds a predetermined temperature, the end portion thermostat 680 cuts off the power to the heat generator group 45. As explained above, the heat generation of the first end portion heat generator 452 and the heat generation of the second end portion heat generator 453 are controlled in the same manner. Accordingly, the temperature of the first end portion heat generator 452 and the temperature of the second end portion heat generator 453 are assumed to be equal in this example. The end portion thermostat 680 is disposed to overlap the first end portion heat generator 452.

As explained above, the center portion heater thermometer 620 and the center portion thermostat 681 are disposed within the range of the center portion heat generator 451. Consequently, the temperature of the center portion heat generator 451 is measured. If the temperature of the center portion heat generator 451 exceeds the predetermined temperature, the power to the heat generator group 45 is cut off.

The end portion heater thermometer 621 and the end portion thermostat 680 are disposed in the ranges of the first end portion heat generator 452 and the second end portion heat generator 453. Consequently, the temperatures of the first end portion heat generator 452 and the second end portion heat generator 453 are measured. If the temperatures of the first end portion heat generator 452 and the second end portion heat generator 453 exceed the predetermined temperatures, the power to the heat generator group 45 is cut off.

The heater thermometers 62 and the thermostats 68 are alternately arranged with one another along the y direction. The first end portion heat generator 452 is disposed on the +y direction side of the center portion heat generator 451. The end portion thermostat 680 is disposed in the range of the first end portion heat generator 452. The center portion heater thermometer 620 is disposed further in the +y direction than the center of the center portion heat generator 451. The center portion thermostat 681 is disposed further in the −y direction than the center of the center portion heat generator 451. As explained above, the second end portion heat generator 453 is disposed on the −y direction side of the center portion heat generator 451. The end portion heater thermometer 621 is disposed in the range of the second end portion heat generator 453. The end portion thermostat 680, the center portion heater thermometer 620, the center portion thermostat 681, and the end portion heater thermometer 621 are disposed in this order from the +y direction end to the −y direction end.

In general, the thermostat 68 connects and disconnects an electric circuit by making use of a bending deformation of bimetal (bimetallic) strip that changes according to the temperature. Thus, the thermostat 68 is usually formed in a long and thin shape to conform to the shape of the bimetal strip. Terminals extend from both the end portions in the longitudinal direction of the thermostat 68 toward the outer side. Connectors for external wires are connected to the terminals by solder, paste, or the like. Accordingly, a space needs to be provided on the outer side in the longitudinal direction of the thermostat 68 to permit wiring connections. Since there is typically very little, to no, spatial margin in the x direction of the fixing device 30, the longitudinal direction of the thermostat 68 is disposed match the y direction. However, if a plurality of thermostats 68 are disposed closely adjacent to one another, it will be difficult to provide a connection space for the necessary external wires.

However, in the present embodiment, as explained above, the heater thermometers 62 and the thermostats 68 are alternately disposed with one another along the y direction. Consequently, a heater thermometer 62 will be disposed next to a thermostat 68 in the y direction. Accordingly, a connection space for the external wires to the thermostat 68 can be provided. Therefore, flexibility of layouts in the y direction for the thermostat 68 and the heater thermometer 62 is improved. Consequently, it is possible to place the thermostat 68 and the heater thermometer 62 in optimum positions and control the temperature of the fixing device 30. Furthermore, it is easier to separate alternating current (AC) wires connected to the thermostats 68 and the direct current (DC) wires connected to the heater thermometers 62. Consequently, noise in the electric circuit is reduced.

As illustrated in FIG. 3, the film thermometer 64 is disposed on the inner side of the fixing film 35 in the +x direction from the heater unit 40. The film thermometer 64 is in contact with the inner circumferential surface of the fixing film 35 and measures the temperature of the fixing film 35.

Figure 7:
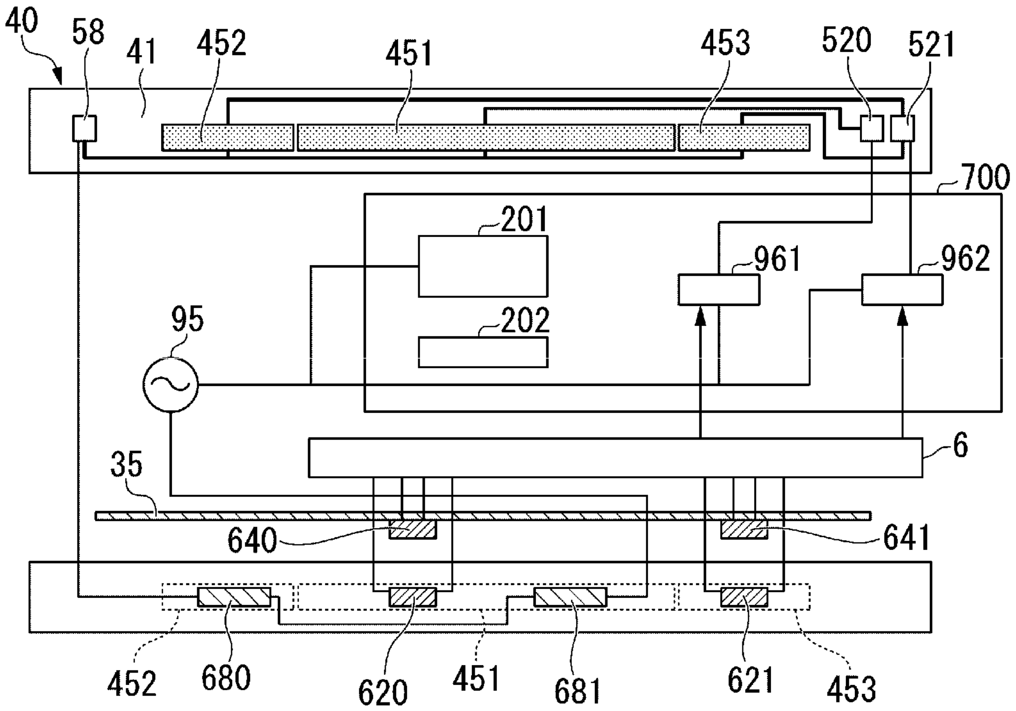
FIG. 7 depicts electrical aspects of a heating device.

FIG. 7 is an electric circuit diagram of a heating device in an example embodiment. In FIG. 7, the bottom view depicted in FIG. 5 is arranged in an upper part and the plan view of FIG. 6 is arranged in a lower part. In the middle part of FIG. 7, a plurality of film thermometers 64 are illustrated together with the cross section of the fixing film 35. The plurality of film thermometers 64 include a center portion film thermometer 640 and an end portion film thermometer 641. Further, in FIG. 7, a heater control substrate 700 is illustrated. The heater control substrate 700 may be, for example, a printed circuit board or the like.

The center portion film thermometer 640 is in contact with the center portion in the y direction of the fixing film 35. The center portion film thermometer 640 is in contact with the fixing film 35 within the range in the y direction of the center portion heat generator 451. The center portion film thermometer 640 measures the temperature of the center portion in the y direction of the fixing film 35. The center portion film thermometer 640 in this example outputs the measured temperature to the control section 6 as digital value. That is, the center portion film thermometer 640 converts an analog measured temperature value to a digital value.

The end portion film thermometer 641 is in contact with the −y direction end portion of the fixing film 35. The end portion film thermometer 641 is in contact with the fixing film 35 within the range in the y direction of the second end portion heat generator 453. The end portion film thermometer 641 measures the temperature of the −y direction end portion of the fixing film 35. The end portion film thermometer 641 outputs the measured temperature value as a digital value to the control section 6. As explained above, the heat generation of the first end portion heat generator 452 and the heat generation of the second end portion heat generator 453 can be controlled in the same manner. Accordingly, the temperature of the −y direction end portion of the fixing film 35 and the temperature of the +y direction end portion of the fixing film 35 are treated as equal.

The heater control substrate 700 includes a power supply voltage detection circuit 201, a thermometer 202 for temperature compensation, a center triac 961, and an end triac 962. A power supply 95 supplies electric power to the heat generator group 45. The power supply 95 is connected to the center contact 520 via the center triac 961. The power supply 95 is connected to the end contact 521 via the end triac 962. The power supply 95 is connected to the power supply voltage detection circuit 201. The thermometer 202 can be provided near an element having temperature dependent performance (for example, a coupler).

The control section 6 controls ON and OFF of the center triac 961 and ON and OFF of the end triac 962 independently from each other. When the control section 6 turns the center triac 961 ON, the center portion heat generator 451 is energized by the power supply 95. Consequently, the center portion heat generator 451 generates heat. If the control section 6 turns the end triac 962 ON, the first end portion heat generator 452 and the second end portion heat generator 453 are energized by the power supply 95. Consequently, the first end portion heat generator 452 and the second end portion heat generator 453 generate heat. Accordingly, the heat generation of the center portion heat generator 451 is controlled independently of the heat generation of the first and second end portion heat generators 452 and 453. The center portion heat generator 451 and the first and second end portion heat generators 452 and 453 are connected in parallel with respect to the power supply 95.

The power supply 95 is connected to the common contact 58 via the center portion thermostat 681 and the end portion thermostat 680. The center portion thermostat 681 and the end portion thermostat 680 are connected in series. If the temperature of the center portion heat generator 451 rises abnormally, the detected temperature of the center portion thermostat 681 will eventually exceed a predetermined threshold temperature. At this time, the center portion thermostat 681 cuts off power from the power supply 95 to the entire heat generator group 45.

If the temperature of the first end portion heat generator 452 rises abnormally, the detected temperature of the end portion thermostat 680 eventually exceeds a predetermined temperature. When this happens, the end portion thermostat 680 cuts off power from the power supply 95 to the entire heat generator group 45. As explained above, the heat generation of the first end portion heat generator 452 and the heat generation of the second end portion heat generator 453 are controlled in the same manner. Accordingly, if the temperature of the second end portion heat generator 453 rises abnormally, the temperature of the first end portion heat generator 452 can be assumed to rise in the same manner. Therefore, when the temperature of the second end portion heat generator 453 rises abnormally, the end portion thermostat 680 cuts off power from the power supply 95 to the entire heat generator group 45 in the same manner.

The temperature of the center portion heat generator 451 is measured by the center portion heat thermometer 620, and this measured temperature is supplied to the control section 6. The temperature of the second end portion heat generator 453 is measured by the end portion heater thermometer 621, and this measured temperature is supplied to the control section 6. The temperature of the second end portion heat generator 453 is assumed to be equal to the temperature of the first end portion heat generator 452. The temperature of the heat generator group 45 is measured by the heater thermometer 62 at a startup time (e.g., a warming-up time upon turning on the device power supply) and on returning from a paused state (e.g., a device sleep or idle state) of the fixing device 30.

At the startup return times, if the temperature of at least one of the center portion heat generator 451 and the second end portion heat generator 453 is lower than some predetermined temperature, the control section 6 causes the heat generator group 45 to generate heat for a short time. Thereafter, the control section 6 begins rotation of the press roller 302. The viscosity of the lubricant applied to the inner circumferential surface of the fixing film 35 decreases according to the brief heat generation of the heat generator group 45. Consequently, slidability between the heater unit 40 and the fixing film 35 at a rotation start time for the press roller 302 is secured.

The temperature of the center portion of the fixing film 35 is measured by the center portion film thermometer 640, and this measured temperature is supplied to control section 6. The temperature of the −y direction end portion of the fixing film 35 is measured by the end portion film thermometer 641, and this measured temperature is supplied to control section 6. The temperature of the −y direction end portion of the fixing film 35 is assumed to be equal to the temperature of the +y direction end portion of the fixing film 35. The temperatures of the center portion and an end portion of the fixing film 35 are measured during the operation of the fixing device 30 and monitored by the control section 6.

The control section 6 can perform phase control or frequency control of electric power supplied to the heat generator group 45 with the center triac 961 and the end triac 962. The control section 6 controls the power to the center portion heat generator 451 based on the temperature measurement result for the center portion of the fixing film 35. The control section 6 controls the power to the first end portion heat generator 452 and the second end portion heat generator 453 based on the temperature measurement result at an end portion of the fixing film 35.

The heat generator group 45 can be formed of a TCR material having a resistance that increases with temperature increases. Accordingly, after the power to the heat generator group 45 is started, the electric power utilized by the heat generator group 45 gradually drops with heating. In view of this issue, it would be conceivable to set initial electric power to be higher in anticipation of the dropping electric power resulting from the resistance change of the TCR material. In general, an image forming apparatus is typically designed to utilize electric power up to ±10%, for example, of the expected commercial power supply in order to cope with fluctuations in the commercial power supply. If the initial power supply setting is set higher in this operating range, it is likely that the electric power setting will exceed an allowable range of a commercial power supply facility and, for example, a circuit breaker will cut off the power.

Furthermore, if electric power higher than the rated power is supplied, the change in the resistance of the TCR material also increases due to the additional heating. Consequently, the amount of change in the resistance value might not fall within the material and design specifications of the heat generator group 45 and the TCR material might fracture. In view of such circumstances, the control section 6 can increase, stepwise, the electric power supplied to the heat generator group 45 after the energization start. This is stepwise power increase process is explained with reference to FIG. 8.

Figure 8:
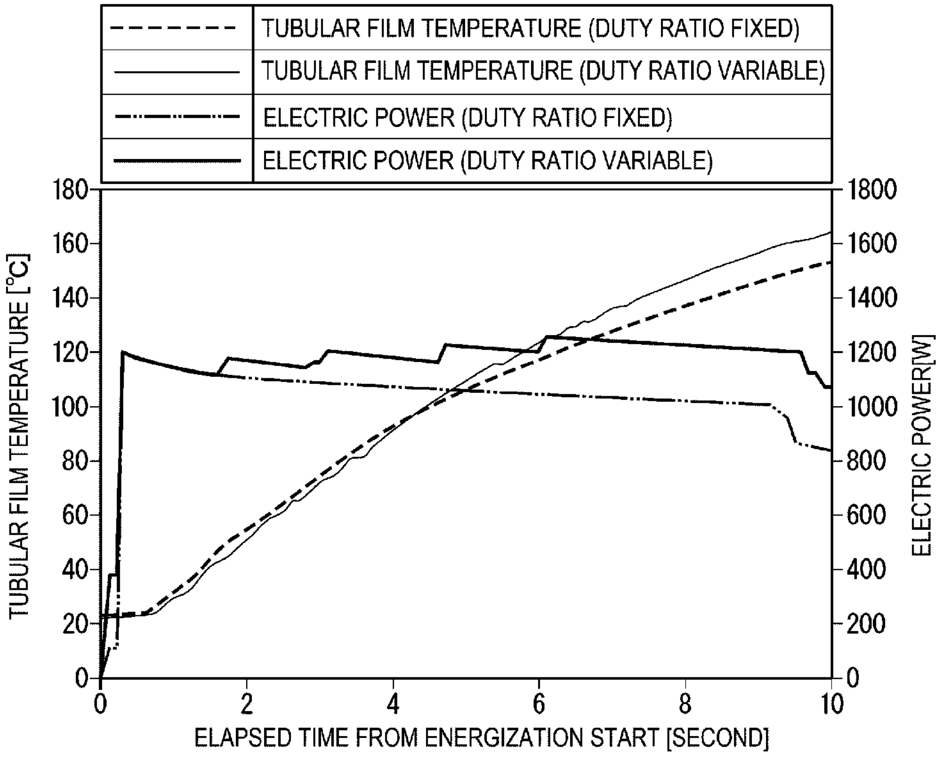
FIG. 8 is a graph depicting experimental results for an elapsed time from an energization start time according to a heat generator setting and a device temperature.

FIG. 8 is a diagram illustrating an example of an experimental result representing a relation between an elapsed time from an energization start time for the heat generator group 45 and the temperature change of the fixing film 35. The horizontal axis of FIG. 8 represents an elapsed time (in seconds) from the start of energization to the heat generator group 45. The left-side vertical axis of FIG. 8 represents temperature (° C.) of the fixing film 35 and the right-side vertical axis represents supplied electric power (in units of watts (W)). The energization start time in FIG. 8 is a start-up time or a return time from an idle device state of the image forming apparatus 100.

As illustrated in FIG. 8, if energization to the heat generator group 45 is performed in a standard energization scheme (that is, a fixed duty-ratio energization scheme), the output of the electric power decreases over time according to a temperature rise of the TCR material. For example, as illustrated in FIG. 8, the electric power is 1200 W immediately after the energization start, but then drops to approximately 1000 W after approximately 9 seconds after the energization start. As explained above, this is because of the characteristics of the TCR material used in the heat generator group 45. Consequently, if the power supply to the heat generator group 45 is performed in the standard energization scheme, the rater of the temperature rise of the fixing film 35 slows down with elapsed time after the energization start.

In contrast, as illustrated in FIG. 8, if the energization to the heat generator group 45 is performed in a start processing-time energization scheme of an embodiment (that is, a variable duty-ratio energization scheme), the duty ratio of the electric power supply is increased in steps after a fixed period (in this example, an interval of 1.5 seconds is used). Thus, the electric power is increased after every fixed period. In this example, the energization to the heat generator group 45 is started at a duty ratio of 80% as the initial setting after a zero power state. Thereafter, the duty ratio is changed four times to 85%, 90%, 95%, and 100% in stages at 1.5 second intervals. According to these changes in the duty ratio, as illustrated in FIG. 8, the electric power is increased four times during the startup/return period. Consequently, a possible drop in the electric power is suppressed.

As illustrated in FIG. 8, an electric power of 1200 W immediately after the energization start is maintained (at approximately 1200 W) even after approximately 9 seconds after the energization start (time zero). Consequently, the possible slow-down in the temperature rise of the fixing film 35 that generally otherwise occurs with elapsed time from the energization start is reduced compared with the standard energization scheme.

Power drop control for reducing the electric power supplied to the heat generator group 45 is explained. In this context, power drop control is the control for reducing the electric power supplied to the heat generator group 45 when the electric power supplied to the heat generator group 45 is greater than a threshold value and a physical quantity indicating previous use, aging, and/or wear of the heat generator group 45 is equal to or larger than a reference value. In this embodiment, examples of the physical quantity indicating the previous use, aging, and/or wear (a prior use metric) for the heat generator group 45 include the cumulative time for which electric power is supplied to the heat generator group 45 and/or the cumulative number of times the temperature of the heat generator group 45 has been raised by a reference temperature or more. In this embodiment, electric power is dropped by reducing a duty ratio of the power supply. A method of reducing the duty ratio may be either a method of reducing the duty ratio after every half wave or a method of reducing the duty ratio according to a phase angle.

Figure 9:
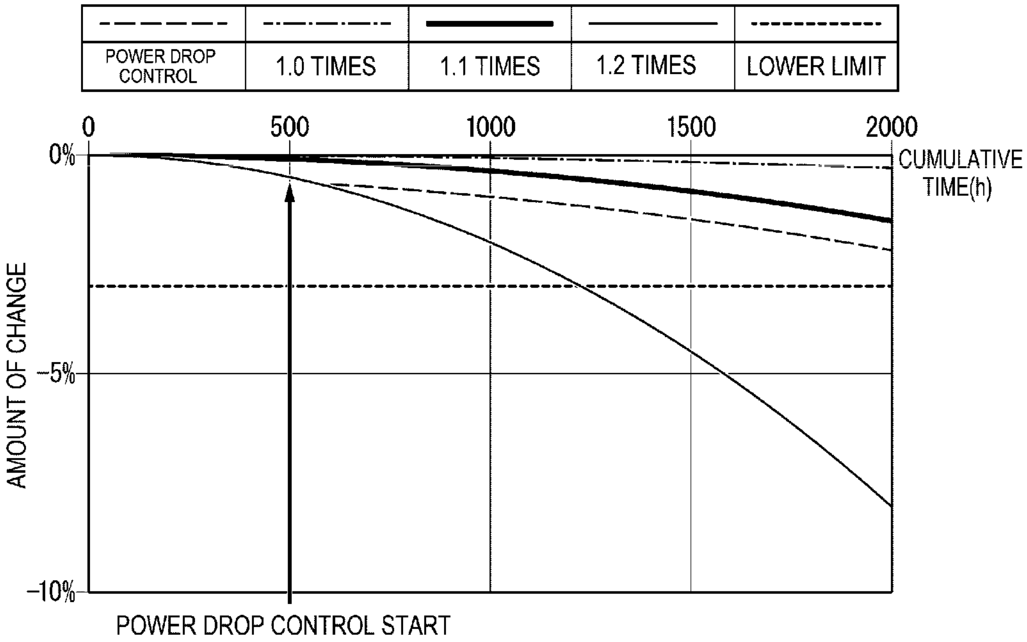
FIG. 9 is a graph depicting an amount of change in a resistance value over time.

In general, if electric power higher than the rated power is supplied to the TCR material, the change in the resistance value increases. FIG. 9 is a diagram illustrating an amount of change of the resistance value with cumulative time at different power drop control values. In FIG. 9, the vertical axis indicates the amount of change of the resistance value and the horizontal axis indicates a cumulative time over which electric power is supplied to the heat generator group 45. FIG. 9 illustrates the amount of change in the case in which a rated voltage is 100 V of the heater generator group 45. In this embodiment, the amount of change equal to or less than ±3% falls within a standard operating condition. If the amount of change does not fall within this standard operating condition, it is determined that the TCR material is broken. A straight line indicating −3% value indicates a lower limit of the standard operating condition in the graph.

In FIG. 9, amounts of change in the cases in which electric power is supplied to the heat generator group 45 at voltages of 1.0 times, 1.1 times, and 1.2 times of the rated voltage are depicted. The voltages are the voltages detected by the power supply voltage detection circuit 201. As illustrated in the graph, if the electric power is supplied at the voltage of 1.0 times or 1.1 times of the rated voltage, the amount of change falls within the standard operating condition even when the cumulative time is 2000 hours. On the other hand, if the electric power is supplied at the voltage of 1.2 times of the rated voltage, the amount of change deviates from the standard operating condition at approximately 1200 hours.

The power drop control was started when the cumulative time exceeded approximately 500 hours, and it was confirmed that the amount of change fell within the standard operating condition even when the cumulative time was 2000 hours. Further, it was confirmed that the amount of change fell within the standard operating condition even when the cumulative time was 20000 hours, which is considered a set life in this example. Accordingly, if the rated voltage is 100 V, a voltage of 1.2 times of the rated voltage may be set as a threshold.

According to the above explanation, if the voltage detected by the power supply voltage detection circuit 201 is equal to or larger than 1.2 times of the rated voltage and the cumulative time is 500 hours or more, the control section 6 drops the electric power supplied to the heat generator group 45. Specifically, the control section 6 controls the center triac 961 and the end triac 962 to reduce the duty ratio of the power supply. Consequently, it is possible to suppress occurrence of a failure due to the heating member.

In FIG. 9, the control is performed using the cumulative time as the physical quantity (a prior use metric) indicating the lifetime use or age. In another experiment, control was performed using the number of times the temperature of the heat generator group 45 is raised by a reference temperature amount or more is utilized. This raising of the temperature by the reference temperature amount may be referred to as a heating cycle, a usage cycle, or the like. Specifically, control performed using the number of times the temperatures detected by the center portion heater thermometer 620 and the end portion heater thermometer 621 are raised by 150° C. or more from an initial temperature is explained.

Figure 10:
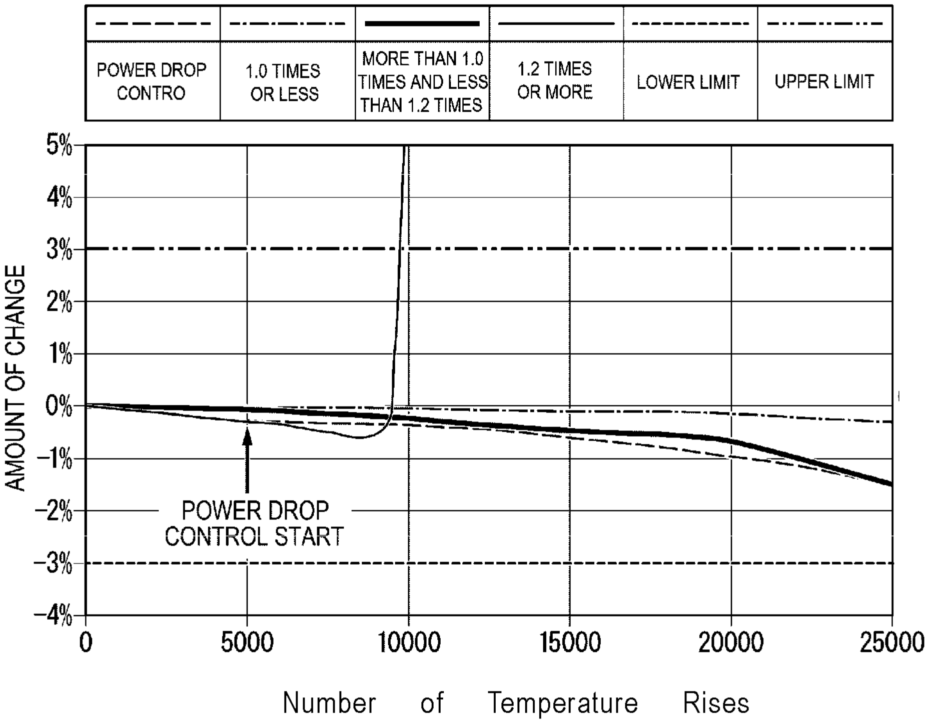
FIG. 10 is a graph depicting an amount of change in a resistance value over time.

FIG. 10 is a diagram illustrating an amount of change of a resistance value. In FIG. 10, the vertical axis indicates the amount of change of the resistance value and the horizonal axis indicates the number of temperature raises. FIG. 10 shows an amount of change when the rated voltage is 200 V.

In this example, the amount of change within ±3% falls within a standard operating condition. If the amount of change does not fall within the standard operating condition, it is determined that the TCR material is broken. One straight line indicating a +3% value is illustrated in the graph and indicates an upper limit of the standard operating condition, and another straight line indicating a −3% value is illustrated in the graph and indicates a lower limit of the standard operating condition.

In FIG. 10, amounts of change in the cases for which electric power is supplied at voltages of 1.0 times or less, more than 1.0 times and less than 1.2 times, and 1.2 times or more of the rated voltage. The voltages are voltages detected by the power supply voltage detection circuit 201. As illustrated in FIG. 10, if the electric power is supplied at the voltage of less than 1.0 times to less than 1.2 times of the rated voltage, the amount of change falls within the standard even if the number of temperature raises is 25000 times. On the other hand, if the electric power is supplied at the voltage of 1.2 times or more of the rated voltage, the amount of change suddenly increases at approximately 10000 temperature raise times because the TCR material fractures and is disconnected.

It was tested that the amount of change fell within the standard operating condition even if the number of temperature raises was 25000 times if the power drop control was started when the number of temperature raises exceeded approximately 5000 times.

If the voltage detected by the power supply voltage detection circuit 201 is 1.2 time or more of the rated voltage and the number of temperature raises is 5000 time or more, the control section 6 drops the electric power supplied to the heat generator group 45. Specifically, the control section 6 controls the center triac 961 and the end triac 962 to reduce the duty ratio of the electric power. Consequently, it is possible to reduce failures due to the breakage of the heating member.

As illustrated in FIG. 10, the amount of change of the resistance value at the voltage of 1.2 times or more of the rated voltage suddenly increases at approximately 10000 times. On the other hand, the amount of change does not suddenly increase at the voltage of less than 1.2 times of the rated voltage. Accordingly, a critical significance is present at 1.2 times of the rated voltage. The sudden increase in the amount of change is caused by the fracture of the TCR material. Therefore, the voltage at which the TCR material fractures has a critical significance. Since the voltage at which the TCR material fractures is decided according to the volume or the cross-sectional area of the TCR material, the critical voltage can be calculated in advance by an experiment or the like. The control section 6 is capable of suppressing occurrence of a deficiency due to the heating member by performing control based on the calculated voltage.

Figure 11:
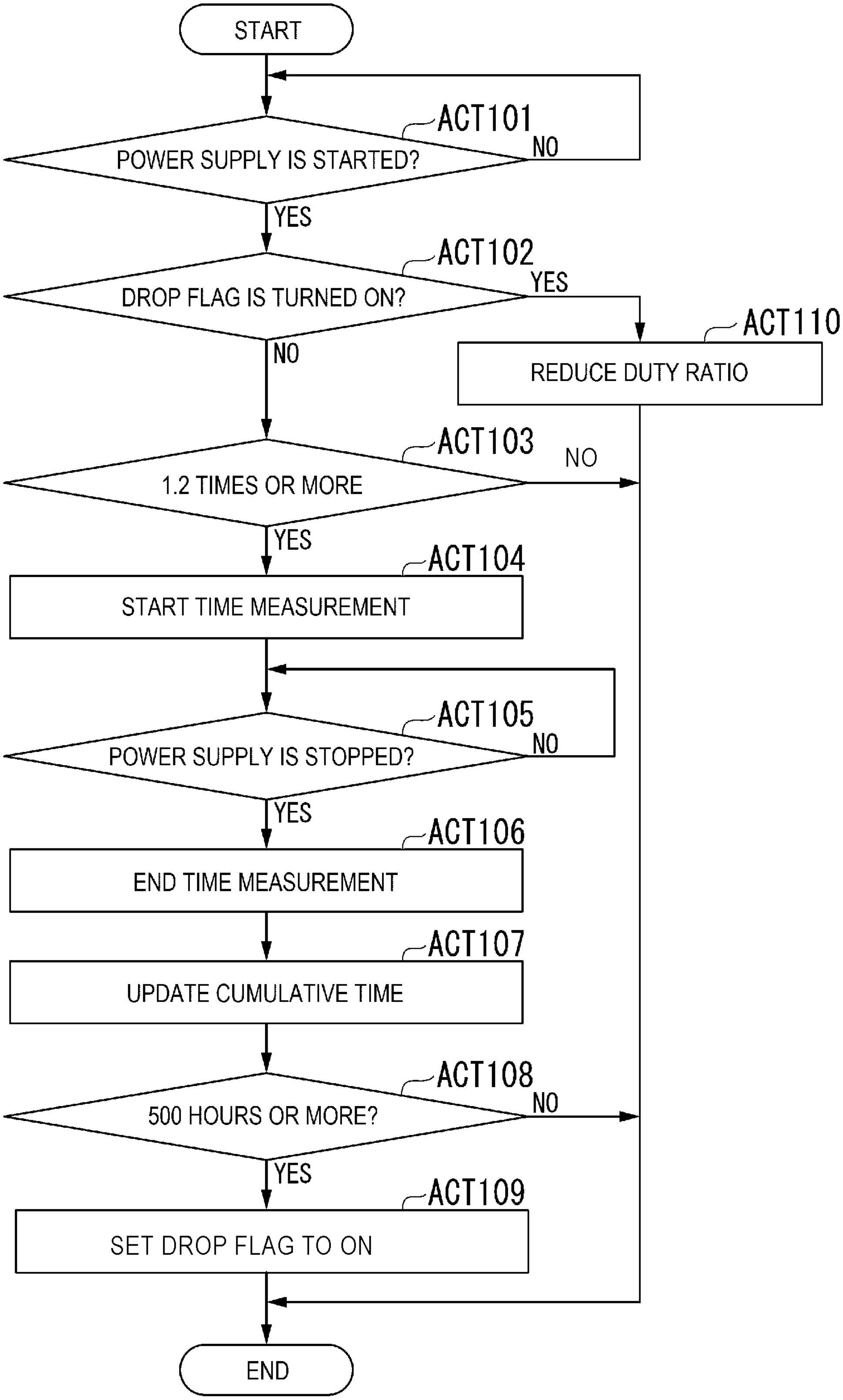
FIG. 11 is a flowchart of control processing performed using a cumulative time value.

FIG. 11 is a flowchart for power drop control performed by the control section 6 using the cumulative time as a measure of prior use (a prior use metric). When an opportunity for starting power supply to the heat generator group 45 arrives (ACT 101), the control section 6 determines whether a power drop flag is set to on (ACT 102). The power drop flag indicates whether the power drop control is to be performed. The power drop flag is set to on when the power drop control is to be performed and is set to off otherwise. The power drop flag is stored in the memory 92.

If the power drop flag is on (YES in ACT 102), the control section 6 reduces the duty ratio and supplies electric power accordingly (ACT 110) and the control processing concerning the power drop control is ended. If the drop flag is off (NO in ACT 102), the control section 6 determines whether the voltage detected by the power supply voltage detection circuit 201 is 1.2 times or more of the rated voltage (ACT 103). If the voltage is less than 1.2 times of the rated voltage (NO in ACT 103), the control processing concerning the power drop control is ended.

If the voltage is 1.2 times or more of the rated voltage (YES in ACT 103), the control section 6 starts a time measurement (ACT 104). The time to be measured in this context is the time for which electric power is supplied at a voltage of 1.2 times or more of the rated voltage. If the supply of the electric power is stopped (YES in ACT 105), the control section 6 ends the time measurement (ACT 106). The control section 6 adds the newly measured time to the cumulative time value stored in the memory 92 to update the cumulative time (ACT 107).

The control section 6 next determines whether the cumulative time is 500 hours or more (ACT 108). If the cumulative time is less than 500 hours (NO in ACT 108), the control processing concerning the power drop control is ended. If the cumulative time is 500 hours or more (YES in ACT 108), the control section 6 sets the power drop flag to ON (ACT 109), and the control processing concerning the power drop control. Since the power drop flag has been turned on, an affirmative determination will be made in ACT 102 at subsequent times and thus the duty ratio of the electric power will be reduced going forward. Therefore, it is possible to suppress occurrence of failures due to the heating member.

Figure 12:
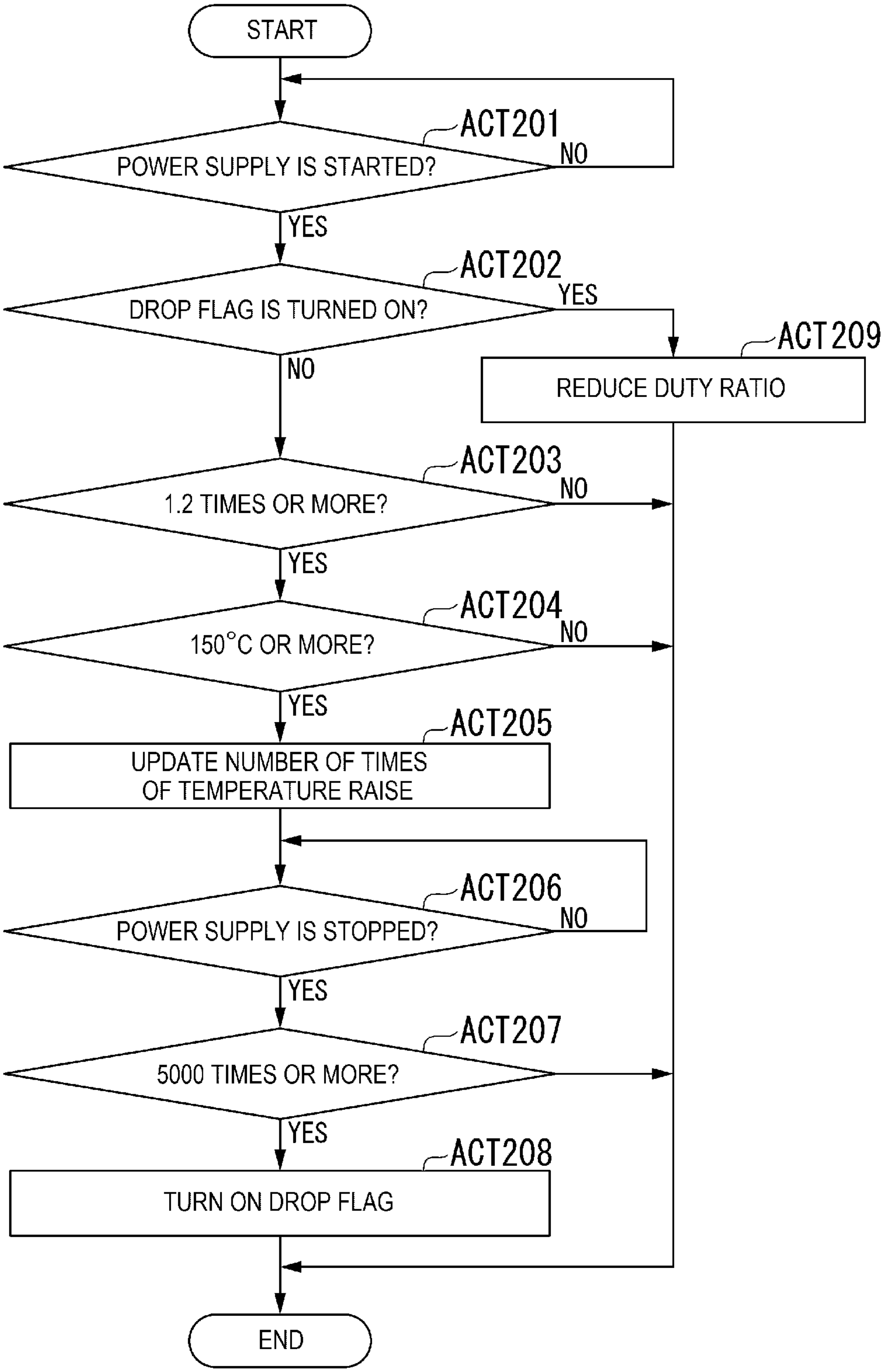
FIG. 12 is a flowchart of control processing performed using a value for the number of times a temperature has been raised.

FIG. 12 is a flowchart illustrating a flow of control processing performed by the control section 6 using the number of temperature raises as measure of prior use (a prior use metric). When an opportunity for starting power supply to the heat generator group 45 arrives (ACT 201), the control section 6 determines whether the power drop flag is set to on (ACT 202).

If the power drop flag is on (YES in ACT 202), the control section 6 reduces the duty ratio and supplies electric power accordingly (ACT 209), and the control processing concerning the power drop control ends. If the drop flag is off (NO in ACT 202), the control section 6 next determines whether a voltage detected by the power supply voltage detection circuit 201 is 1.2 times or more of the rated voltage (ACT 203). If the voltage is less than 1.2 times of the rated voltage (NO in ACT 203), the control processing concerning the power drop control ends.

If the voltage is 1.2 times or more of the rated voltage (YES in ACT 203), the control section 6 next determines whether temperatures detected by the center portion heater thermometer 620 and the end portion heater thermometer 621 were increased by 150° C. or more from an initial temperature (ACT 204). If the temperatures were not raised by 150° C. or more from the initial temperature (NO in ACT 204), the control processing concerning the power drop control ends.

If the temperatures were raised by 150° C. or more from the initial temperature (YES in ACT 204), the control section 6 increases the number of temperature raises by one to update the stored number of temperature raises (ACT 205). The number of temperature raises is stored in the memory 92. Once the supply of the electric power is stopped (ACT 206), the control section 6 determines whether the number of temperature raises is 5000 times or more (ACT 207). If the number of temperature raises is less than 5000 times (NO in ACT 207), the control processing concerning the power drop control ends. If the number of temperature raises is 5000 times or more (YES in ACT 207), the control section 6 set the drop flag to on (ACT 208), and the control processing concerning the power drop control ends. Since the drop flag has now been turned on, an affirmative determination will be made in ACT 202 at subsequent times and the duty ratio of the electric power will be reduced. Therefore, it is possible to suppress occurrence of a failure due to the heating member.

In the example explained above, the degree to which the electric power is dropped can be decided according to the quality of the TCR material, the value of the rated voltage, and the like. Therefore, the quality of the TCR material, the value of the rated voltage, and the like may be obtained in advance by an experiment or the like. The control for reducing the duty ratio is explained as an example of the control for dropping the electric power. However, the control for dropping the electric power is not limited to this. For example, the electric power may be dropped by reducing the voltage applied.

In FIG. 8, the electric power supplied to the heat generator group 45 after the energization start is increased stepwise. However, under the power drop control, the electric power is set based on the reduced duty ratio. Specifically, it is assumed that the maximum duty ratio under the power drop control is 80%. As in FIG. 8, it is assumed that energization to the heat generator group 45 is started at the duty ratio of 80% and, thereafter, the duty ratio is changed four times in total to 85%, 90%, 95%, and 100% intervals of 1.5 seconds.

In this case, the control section 6 performs control to start the energization to the heat generator group 45 at a duty ratio of 64% (64%=80%×80%). Thereafter, the control section 6 changes the duty ratio four times in total to 68% (=85%×80%), 72% (=90%×80%), 76% (=95%×80%), and 80% (=100%×80%) at intervals of 1.5 seconds. Consequently, since the maximum duty ratio during the power drop control does not exceed 80%, it is possible to suppress occurrence of a deficiency or failure due to the heating member.

With the image forming apparatus 100, it is possible to reduce occurrences of a deficiency due to a heating member failure or the like. It is thus also possible to minimize a downtime of the image forming apparatus 100 that might otherwise be caused by a failure of the heating member.

Certain functions of an image forming apparatus according to an embodiment may be realized by a computer or computer system executing a software program or the like. Such a case, the program may be recorded in a non-transitory computer-readable recording medium or downloaded via a communication network or the like. A "computer system" in this context can include an operating system (OS) and additional hardware such as peripheral devices. A "computer-readable recording medium" refers to a portable medium such as a flexible disk, a magneto-optical disk, a ROM, or a CD-ROM or a storage device such as a hard disk incorporated in the computer system. The "computer-readable recording medium" may include a recording medium accessible via a network such as the Internet or a communication line such as a telephone line. In some instances, the "computer-readable recording medium" may be a cloud-based system, a server, a client, or the like. A program may realize various functions in a combination with another program already stored in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
- a fixing device including a heating element configured to heat a sheet for fixing operations;
- a memory unit;
- a power supply configured to supply electric power to the heating element; and
- a controller configured to control the power supply to supply reduced, but nonzero, electric power to the heating element for a fixing operation if a cumulative time value stored in the memory unit is equal to or greater than a reference time value, the cumulative time value being the summed total of time the electric power has been supplied to the heating element during all prior fixing operations of the fixing device.

2. The image forming apparatus according to claim 1, wherein the controller controls the power supply to supply the reduced electric power during a startup period.

3. The image forming apparatus according to claim 2, wherein the startup period is a return from an idle device state.

4. The image forming apparatus according to claim 2, wherein the startup period is a powerup from a device off state.

5. The image forming apparatus according to claim 1, wherein the reduction in the electric power by the controller when the cumulative time value is equal to or greater than the reference time value is contingent on an electric power level supplied from the power supply being equal to or greater than a threshold power level value.

6. The image forming apparatus according to claim 1, wherein the controller is configured to control a duty ratio to control the electric power to the heating element.

7. The image forming apparatus according to claim 1, further comprising:
- a storage device, wherein
- the cumulative time value is stored in the storage device in a device off state.

8. The image forming apparatus according to claim 1, wherein the controller is configured to set a power drop flag to indicate that the cumulative time value has met or exceeded the reference time value.

9. The image forming apparatus according to claim 1, wherein the controller is configured to control the power supply to supply reduced electric power supplied to the heating element during a startup period whenever the cumulative time value is greater than the reference time value.

10. The image forming apparatus according to claim 1, wherein the heating element comprises a temperature coefficient resistance (TCR) material that increases in electrical resistance with increasing temperature.

11. An image forming apparatus, comprising:
- a fixing device including a heating element configured to heat a sheet for fixing operations;
- a power supply configured to supply electric power to the heating element; and
- a controller configured to control the power supply to supply reduced, but nonzero, electric power to the heating element for a fixing operation if a cumulative number of times a temperature of the heating element has been increased by a reference temperature amount during all prior fixing operations of the fixing device is equal to or greater than a reference value.

12. The image forming apparatus according to claim 11, wherein the controller controls the power supply to supply the reduced electric power during a startup period.

13. The image forming apparatus according to claim 12, wherein the startup period is a return from an idle device state.

14. The image forming apparatus according to claim 12, wherein the startup period is a powerup from a device off state.

15. The image forming apparatus according to claim 11, wherein the reduction in the electric power when the cumulative number of times is equal to or greater than the reference value is contingent on an electric power level supplied from the power supply being equal to or greater than a threshold power level value.

16. The image forming apparatus according to claim 11, wherein the controller is configured to control a duty ratio to control the electric power to the heating element.

17. The image forming apparatus according to claim 11, further comprising:

a storage device, wherein the cumulative number of times is stored in the storage device.

18. The image forming apparatus according to claim 11, wherein the controller is configured to set a power drop flag to indicate that the cumulative number of times has met or exceeded the reference value.

19. The image forming apparatus according to claim 11, wherein the controller is configured to reduce the electric power supplied to the heating element during a startup period whenever the cumulative number of times is greater than the reference value.

20. The image forming apparatus according to claim 11, wherein the heating element comprises a temperature coefficient resistance (TCR) material that increases in electrical resistance with increasing temperature.

* * * * *